US012151386B2

(12) United States Patent
Nelson et al.

(10) Patent No.: US 12,151,386 B2
(45) Date of Patent: *Nov. 26, 2024

(54) UTILITY KNIFE

(71) Applicant: TECHTRONIC CORDLESS GP, Anderson, SC (US)

(72) Inventors: Samuel Nelson, Easley, SC (US); Richard M. Davidian, Pickens, SC (US); Rony Chan, Simpsonville, SC (US); Cam Craig, Anderson, SC (US); Patrick L. Wills, Easley, SC (US); Jeremy Fedrigon, Greenville, SC (US); Trevor Fauss, Greenville, SC (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,143

(22) Filed: Dec. 19, 2023

(65) Prior Publication Data

US 2024/0116201 A1 Apr. 11, 2024

Related U.S. Application Data

(63) Continuation of application No. 17/494,413, filed on Oct. 5, 2021, now Pat. No. 11,865,735.

(Continued)

(51) Int. Cl.
*B26B 5/00* (2006.01)

(52) U.S. Cl.
CPC ..................................... *B26B 5/00* (2013.01)

(58) Field of Classification Search
CPC ................................. B26B 5/00; B26B 5/002
(Continued)

(56) References Cited

U.S. PATENT DOCUMENTS

| | | | |
|---|---|---|---|
| 855,280 | A | 5/1907 | Campbell |
| 2,250,237 | A | 7/1941 | Schwartzkopf |

(Continued)

FOREIGN PATENT DOCUMENTS

| | | | |
|---|---|---|---|
| CN | 2688464 | Y | 3/2005 |
| CN | 201128157 | Y | 10/2008 |

(Continued)

OTHER PUBLICATIONS

Fiskars, "Fiskars®—How to Change the Blade on the Easy Change Detail Knife," <https://www.youtube.com/watch?v=JXxn6cPWQYc> YouTube video dated May 5, 2017.

(Continued)

*Primary Examiner* — Omar Flores Sanchez
(74) *Attorney, Agent, or Firm* — Michael Best & Friedrich LLP

(57) ABSTRACT

A utility knife includes a handle having a body and a receiving aperture. The utility knife further includes a collet at least partially receivable in the receiving aperture, and a sleeve that is engageable with and that surrounds the collet. The collet is configured to alternately receive one of a portion of a blade of a first type in a first slot and a portion of a blade of a second type in a second slot. The collet and the sleeve are co-rotatable relative the handle to move the collet to a secured position in which one of the blade of the first type and the blade of the second type are secured to the collet.

20 Claims, 10 Drawing Sheets

Related U.S. Application Data

(60) Provisional application No. 63/088,144, filed on Oct. 6, 2020.

(58) Field of Classification Search
USPC .................................................... 30/151, 152
See application file for complete search history.

(56) References Cited

U.S. PATENT DOCUMENTS

| | | | |
|---|---|---|---|
| 2,619,724 | A | 12/1952 | Manthey et al. |
| 2,736,964 | A | 3/1956 | Frank |
| 3,549,159 | A | 12/1970 | Kroener |
| 3,593,417 | A | 7/1971 | West et al. |
| 3,831,276 | A | 8/1974 | Dalton et al. |
| 3,964,163 | A | 6/1976 | Russo |
| 3,967,377 | A | 7/1976 | Wells |
| 3,977,077 | A | 8/1976 | Rebold |
| 3,977,079 | A | 8/1976 | Rebold |
| 4,400,878 | A | 8/1983 | Vaudreuil |
| 4,531,286 | A | 7/1985 | Vito et al. |
| 4,657,016 | A | 4/1987 | Garito et al. |
| 4,662,070 | A | 5/1987 | Reddig |
| 4,754,754 | A | 7/1988 | Garito et al. |
| 4,817,284 | A | 4/1989 | Sacherman et al. |
| 4,862,772 | A | 9/1989 | Piperato |
| 5,025,558 | A | 6/1991 | Gilbert |
| 5,042,154 | A | 8/1991 | Gilbert |
| 5,174,178 | A | 12/1992 | Disston, Jr. |
| 5,175,934 | A | 1/1993 | Chao |
| 5,265,343 | A | 11/1993 | Pascaloff |
| 5,528,831 | A | 6/1996 | Fortenberry |
| 5,657,541 | A | 8/1997 | Hickok et al. |
| 5,782,853 | A | 7/1998 | Zeevi et al. |
| 5,911,481 | A | 6/1999 | Yost |
| 5,911,761 | A | 6/1999 | Tilley |
| 6,233,833 | B1 | 5/2001 | Grant et al. |
| 6,330,749 | B1 | 12/2001 | Khachatoorian et al. |
| 6,357,120 | B1 | 3/2002 | Khachatoorian et al. |
| 6,434,836 | B1 | 8/2002 | Olivares |
| 6,502,311 | B1 | 1/2003 | Khachatoorian et al. |
| D477,679 | S | 7/2003 | Yuen |
| 6,640,445 | B1 | 11/2003 | Crawford |
| 6,751,875 | B2 | 6/2004 | Jones |
| D515,392 | S | 2/2006 | Xingguo |
| 7,107,691 | B2 | 9/2006 | Nottingham et al. |
| D544,507 | S | 6/2007 | Crouch |
| 7,441,338 | B2 | 10/2008 | Delfini et al. |
| 7,726,031 | B1 | 6/2010 | Gibbs |
| 8,056,242 | B2 | 11/2011 | Chen |
| 8,117,755 | B2 | 2/2012 | Scimone |
| 8,262,095 | B2 | 9/2012 | Chen |
| 8,272,135 | B2 | 9/2012 | Zhou |
| 8,291,598 | B2 | 10/2012 | Corron et al. |
| 8,555,516 | B2 | 10/2013 | Da Graca |
| 8,826,549 | B2 | 9/2014 | Da Graca |
| 9,186,735 | B2 | 11/2015 | Da Graca |
| 9,610,701 | B1 | 4/2017 | Yost et al. |
| 10,112,238 | B2 | 10/2018 | Chen |
| 10,195,725 | B2 | 2/2019 | Sun |
| 10,464,223 | B2 | 11/2019 | Scalise |
| 10,525,605 | B2 | 1/2020 | Scimone et al. |
| 10,569,433 | B1 | 2/2020 | Wong |
| 10,800,051 | B2 | 10/2020 | Ronan et al. |
| 10,889,013 | B2 | 1/2021 | Scimone et al. |
| 11,104,013 | B2 | 8/2021 | Scimone et al. |
| D994,441 | S | 8/2023 | Nelson et al. |
| 11,865,735 | B2 * | 1/2024 | Nelson ...................... B26B 5/00 |
| 2004/0163264 | A1 | 8/2004 | Simonz |
| 2004/0261241 | A1 | 12/2004 | Crouch |
| 2006/0005402 | A1 | 1/2006 | Nottingham et al. |
| 2008/0110033 | A1 | 5/2008 | Peterson et al. |
| 2009/0066040 | A1 | 3/2009 | Teng et al. |
| 2010/0005665 | A1 | 1/2010 | Elliott et al. |
| 2010/0024219 | A1 | 2/2010 | Hernandez |
| 2010/0024221 | A1 | 2/2010 | Hernandez |
| 2010/0107418 | A1 | 5/2010 | Chen |
| 2015/0068044 | A1 | 3/2015 | Watt |
| 2017/0099904 | A1 | 4/2017 | Farnum et al. |
| 2018/0001489 | A1 | 1/2018 | Scimone et al. |
| 2018/0001490 | A1 | 1/2018 | Scimone et al. |
| 2018/0028214 | A1 | 2/2018 | Friedman et al. |
| 2018/0311840 | A1 | 11/2018 | Korin |
| 2019/0224862 | A1 | 7/2019 | Hou et al. |
| 2020/0215704 | A1 | 7/2020 | Scimone et al. |

FOREIGN PATENT DOCUMENTS

| | | | |
|---|---|---|---|
| CN | 201950288 | U | 8/2011 |
| CN | 101890536 | B | 2/2012 |
| CN | 202622741 | U | 12/2012 |
| CN | 202701497 | U | 1/2013 |
| CN | 203861316 | U | 10/2014 |
| CN | 204169906 | U | 2/2015 |
| CN | 102528161 | B | 9/2015 |
| CN | 206170143 | U | 5/2017 |
| CN | 206967531 | U | 2/2018 |
| CN | 105983728 | B | 4/2019 |
| CN | 209465767 | U | 10/2019 |
| CN | 110405276 | A | 11/2019 |
| CN | 210336030 | U | 4/2020 |
| CN | 210451194 | U | 5/2020 |
| CN | 111936273 | A | 11/2020 |
| CN | 111993470 | A | 11/2020 |
| DE | 10237655 | B4 | 6/2011 |
| DE | 202016103076 | U1 | 7/2016 |
| DE | 202012013677 | U1 | 6/2019 |
| EP | 0732165 | A1 | 9/1996 |
| EP | 3610998 | A2 | 2/2020 |
| GB | 255306 | A | 7/1926 |
| GB | 662292 | A | 12/1951 |
| GB | 2063140 | A | 6/1981 |
| GB | 2454175 | B | 3/2010 |

OTHER PUBLICATIONS

Extended European Search Report for Application No. 21201310.6 dated Jun. 15, 2022 (11 pages).
Amazon, "Astro Pneumatic Tool 930 Air Body Saber Saw with 5pc 24 Teeth per Inch Saw Blades," <https://www.amazon.com/Astro-Pneumatic_tool-930-Blades/dp/B006RF96AM/ref> web page visited Feb. 16, 2023 (1 page).

* cited by examiner

Collet Fit Into Handle

Collet With #2 Blade

Collet With #11 Blade

Collet With #11 Blade (View 2)

UTILITY KNIFE

CROSS-REFERENCE TO RELATED APPLICATION

This application is a continuation of U.S. application Ser. No. 17/494,413, filed Oct. 5, 2021, and claims priority to U.S. Provisional Patent Application No. 63/088,144, filed Oct. 6, 2020, the entire contents of each of which is incorporated herein by reference.

BACKGROUND

The present disclosure relates to utility knives. More particularly, the present disclosure relates to a blade holding device for a utility knife.

SUMMARY

In one independent aspect, a utility knife includes a handle having a body and a receiving aperture, a collet at least partially receivable in the receiving aperture, and a sleeve engageable with and surrounding the collet. The collet has a first end and a second end. The first end of the collet includes a first slot and a second slot formed therein. The first slot has a first dimension and the second slot has a second dimension different than the first dimension. The collet is configured to alternately receive one of a portion of a blade of a first type in the first slot and a portion of a blade of a second type in the second slot. The sleeve and the collet are co-rotatable relative the handle to move the collet to a secured position in which one of the blade of the first type and the blade of the second type are secured to the collet.

In another independent aspect, a utility knife includes a collet elongated along an axis, a sleeve, and a knife handle. The collet includes a body having a first width, a head having a second width greater than the first width, a first slot extending along the axis into the head, a second slot extending along the axis into the head, and a threaded shank. The first slot has a first length, and the second slot intersects the first slot and has a second length, the first slot and the second slot each configured to receive a different type of blade having tangs with different lengths. The sleeve partially surrounds the head of the collet, rotation of the sleeve causing movement of the collet relative to the knife handle in a direction parallel to the axis. The sleeve is movable between a release position and a blade holding position, and the sleeve compresses the head while in the blade holding position to retain a blade positioned in one of the first slot and the second slot. The knife handle is configured to receive the threaded shank.

In yet another independent aspect, a utility knife is configured for interchangeable use with a plurality of types of knife blades. The utility knife includes a collet including a first end and a second end, a first slot positioned in the first end and configured to receive a knife blade of a first type, and a second slot positioned in the second end and configured to alternately receive a knife blade of a second type. The first slot has a first dimension, and the second slot has a second dimension different from the first dimension. The collet is movable between a clamped position and a released position, the collet compressing the first slot and the second slot while in the clamped position.

Other aspects will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

The use of "including," "comprising," or "having," and variations thereof herein is meant to encompass the items listed thereafter and equivalents thereof as well as additional items. Unless specified or limited otherwise, the terms "mounted," "connected," "supported," and "coupled," and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1A:
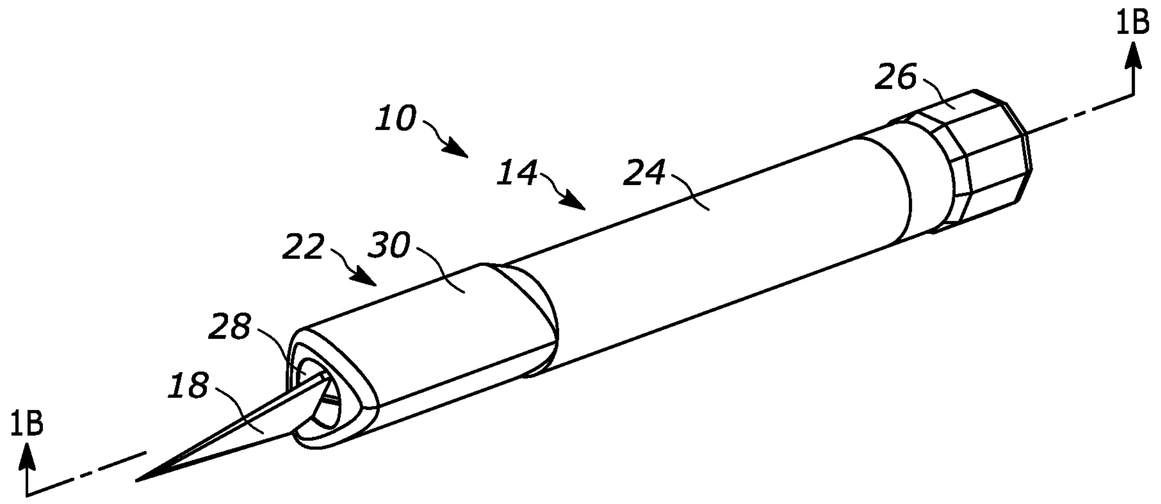
FIG. 1A is a perspective view of a utility knife according to one embodiment.
Figure 1B:
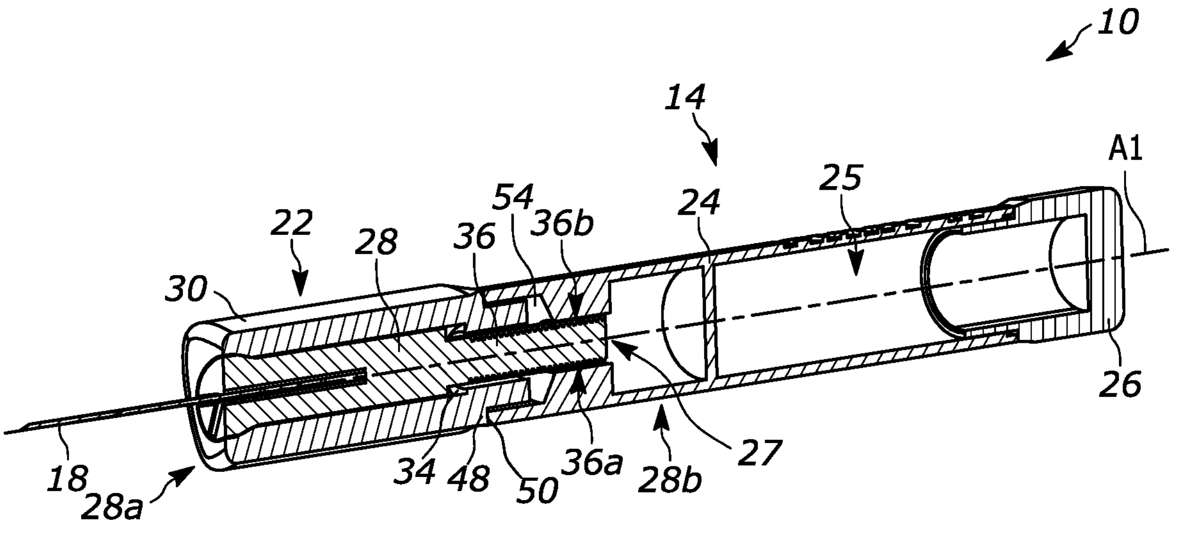
FIG. 1B is a cross-sectional view of the utility knife of FIG. 1A, viewed along section 1B-1B.

FIGS. 1A and 1B illustrate a utility knife 10 according to an exemplary embodiment. The utility knife 10 includes a handle 14, a blade 18, and a blade holding mechanism or chuck 22. Shown particularly in FIG. 1B, the handle 14, which is graspable by a user, has a body 24 elongated along an axis A1 that defines an internal storage space 25 therein. The handle 14 further supports an end cover or cap 26 that is removably coupled to an end of the body 24. In the illustrated embodiment, the cap 26 is a threaded end cap 26 that is threadable onto or into the body 24, and at least a portion of the cap 26 is hollow such that, when the cap 26 is attached to the body 24, the void 25 extends into the cap

26. In the illustrated embodiment, the cap 26 is disposed at one end (e.g., a rear end) of the utility knife 10, opposite an end on which the chuck 22 is supported (e.g., a front end of the knife 10). Although a threadable cap 26 is shown in the illustrated embodiment, non-threaded caps are also contemplated.

The chuck 22 is capable of selectively supporting any one of multiple different types of blades (e.g., differently sized blades, differently dimensioned blades, blades having different blade shapes or geometries, and/or the like) and retains each blade 18 in a manner suitable for using the knife 10 in a cutting operation. The illustrated utility knife 10 is configured to alternately receive any one of the variety of blades in the chuck 22 depending on a desired cutting application/operation. The illustrated utility knife 10 is further configured to store the variety of blades in the storage space 25 when not in use.

Portions of the chuck 22 may be caused to rotate to secure the blade 18 against movement relative to the chuck 22 to perform a cutting operation. As shown in FIG. 1B, the chuck 22 includes a collet 28 and a spindle or sleeve 30 that cooperate to selectively secure the blade 18 to the chuck 22. In the illustrated embodiment, the sleeve 30 includes a gripping surface or texture (e.g., on an outer surface) and may include or be formed from a gripping material. Additionally, the sleeve 30 may have a polygonal shape; for example, in the illustrated embodiment, the sleeve 30 is generally triangular; in other embodiments, the sleeve may be hexagonal, heptagonal, etc.

Figure 3:
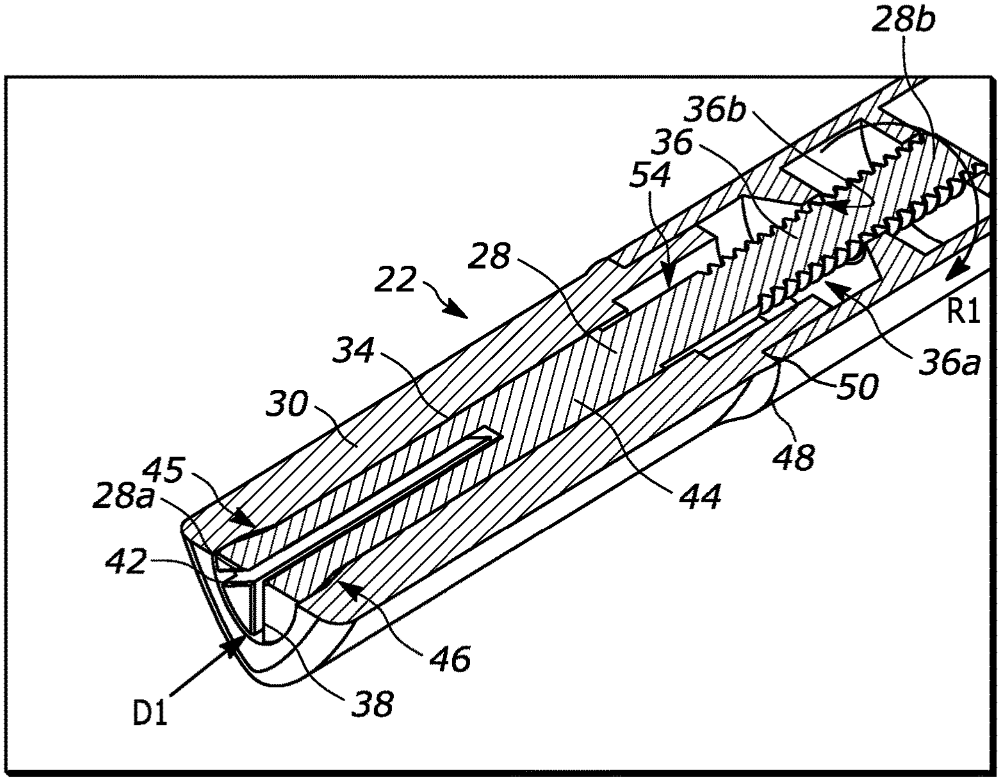
FIG. 3 is a perspective cross-sectional view of a portion of the collet of FIG. 2, viewed along section 3-3.
Figure 4A:
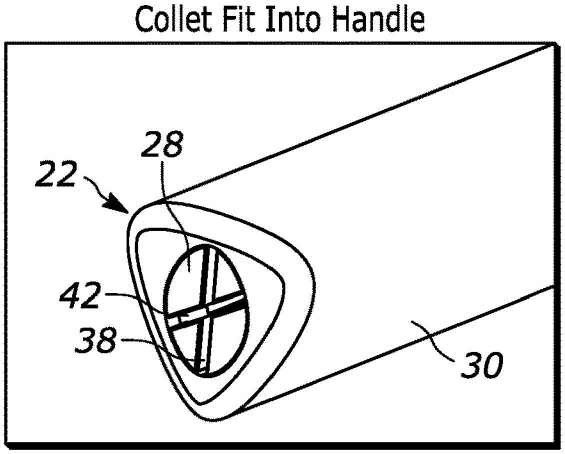
FIGS. 4A-4D are enlarged perspective views of a collet supporting different blades.
Figure 4B:
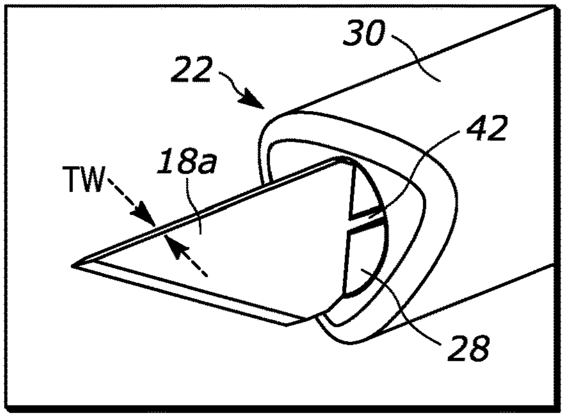
Figure 4C:
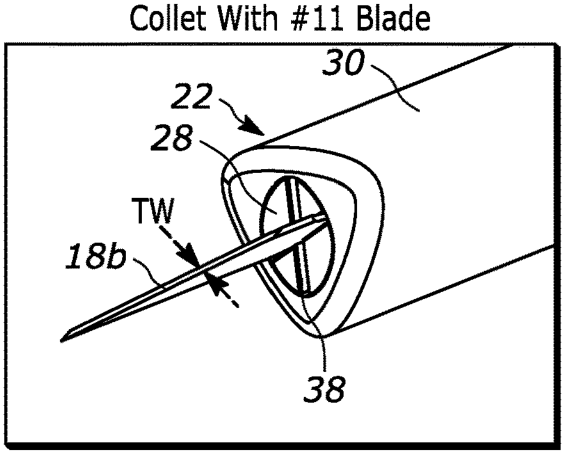
Figure 4D:
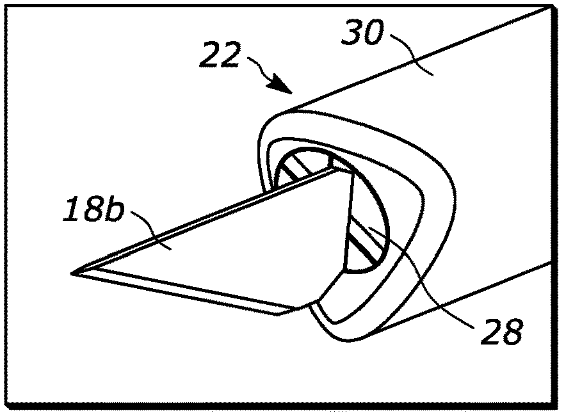
Figure 5:
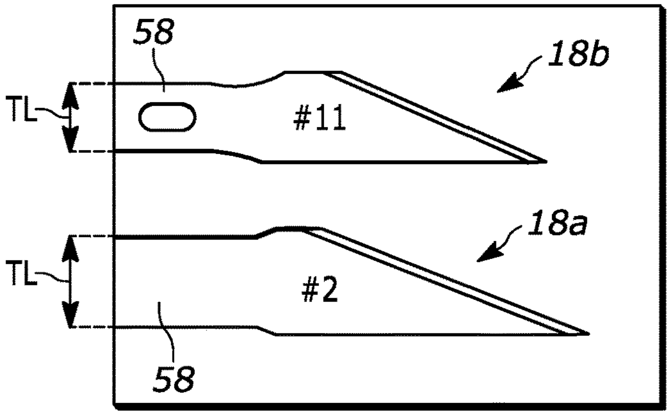
FIG. 5 is a side view of different types of blades.

With reference to FIGS. 1B and 3, the collet 28 is positioned within a channel 34 of the sleeve 30. A first end 28*a* of the collet 28 may engage and supports the blade 18, and a second end 28*b* of the collet 28 may engage the handle 14. In the illustrated embodiment, the second end includes a threaded shank or stem 36 having threads 36*a* that are configured to engage corresponding threads 36*b* on an inner surface of the handle 14 (e.g., within a receiving aperture 27 of the handle 14).

The first end 28*a* of the collet 28 includes a plurality of slots such as a first slot 38 having a first dimension (e.g., a first length L1 and/or a first width W1), and a second slot 42 having a second dimension (e.g., a second length L2 and/or a second width W2) that is different from the first dimension. As described in greater detail below, the first slot 38 and the second slot 42 may have different dimension(s) and/or be configured to alternately accommodate blades that have different sizes and/or shapes, such as at least a first blade 18*a* and a second blade 18*b*. In the illustrated embodiment, the first slot 38 and the second slot 42 may intersect one another. Non-intersecting slots (e.g., parallel slots and/or the like) are also contemplated.

When the sleeve 30 is actuated (e.g., rotated, twisted, and/or the like), the collet 28 may rotate along with the sleeve 30 due to a generally non-circular (e.g., elliptical) geometry 33 (FIG. 2) shared by the collet 28 and the sleeve 30. As the sleeve 30 is rotated in a first direction R1, the threads 36*a* of the collet 28 may engage the threads 36*b* in the receiving aperture 27 of the handle 14 to thereby axially move the collet 28 toward a first or clamped position (e.g., toward the handle 14). Stated another way, the collet 28 and sleeve 30 can be rotatable relative the handle 14 in a first rotational direction R1 (e.g., a clockwise "CW" direction) to draw or thread the shank 36 further into the aperture 27 and the collet 28 and sleeve 30 can be rotatable relative the handle 14 in a second rotational direction (e.g., a counter clockwise "CCW" direction) to unthread or retract the shank 36 from the aperture 27. In this way, the first width W1 and the second width W2 may be reduced as the collet 28 is drawn into and/or closer to the handle 14 to thereby clamp down on the blade 18 for holding the blade stationary during a cutting operation.

Figure 2:
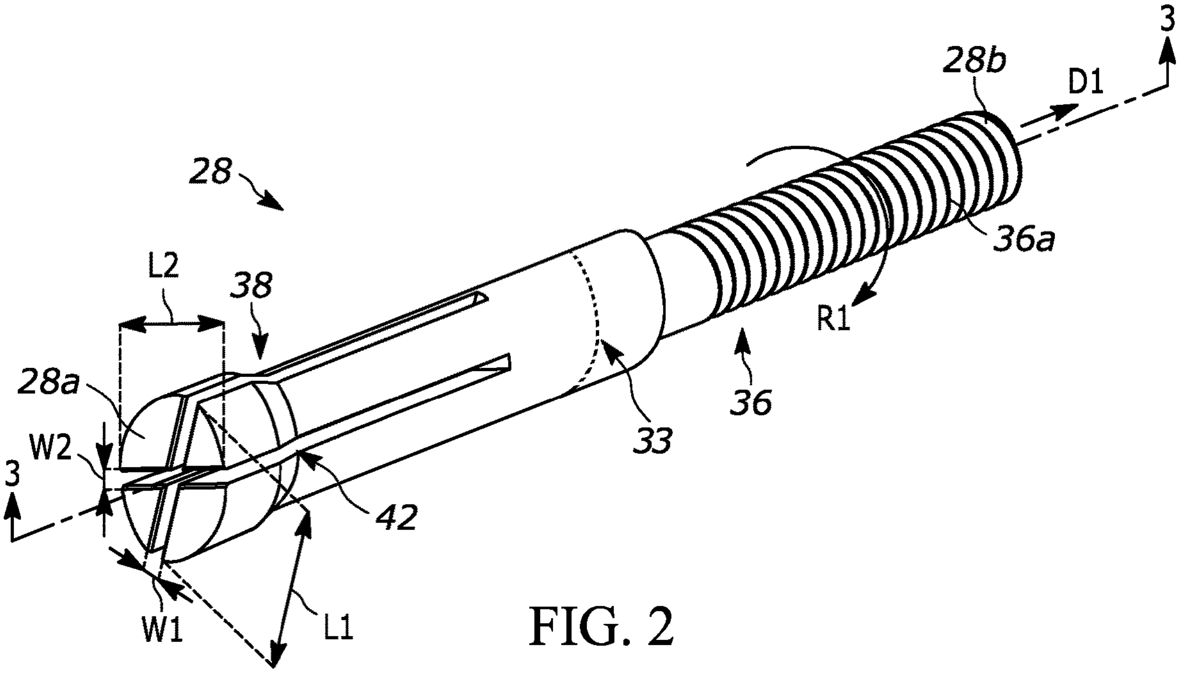
FIG. 2 is a perspective view of a collet of the utility knife of FIG. 1A.

Referring to FIGS. 2 and 3, as the chuck 22 is rotated in the first direction R1, the collet 28 may move along the axis A1 in a first direction D1. As the chuck 22 is rotated in a second direction, which may be generally opposite the first direction R1, the collet 28 may move along the axis A1 in a second direction, which may be generally opposite the first direction D1. The non-circular geometry 33 inhibits relative rotational motion between the collet 28 and the sleeve 30. In the illustrated embodiment, a cross-section of an outer face of the collet 28 and the channel 34 or another inner face of the sleeve 30 are substantially elliptical or ovular. In other embodiments, the non-circular geometry 33 may have a different profile. In other embodiments, the cross-section may be circular and/or the collet and/or sleeve may include one or more features to inhibit relative rotation, such as a lug, key, or the like.

Referring still to FIGS. 2 and 3, the collet 28 further includes a body 44 formed between the ends 28*a*, 28*b* of the collet 28. In the illustrated embodiment, the body 44 includes the truncated stem 36 and has a first cross-sectional width (e.g., first circumference). A head 45 is formed on the collet 28 adjacent the first end 28*a* and has a second circumference that is greater than the first circumference. As best illustrated in FIG. 3, the head 45 is "bulbed" shaped and/or tapered outwardly such that the body 44 transitions into the head 45. The head 45 may be complemented by an oppositely tapered and/or flared face 46 of the sleeve 30. In other words, the head 45 may be enlarged relative to the body 44, and an outer surface of the head 45 engages a portion of the sleeve 30.

As illustrated in FIGS. 1B and 3, the sleeve 30 further includes a stop surface or ring 48 that may bear and/or slip against the handle 14 such that the collet 28 is secured (e.g., pinned, trapped, stopped, and/or the like) by the flared face 46 at one end as the chuck 22 is rotated to draw the collet 28 toward the handle 14. The stop ring 48 abuts against a stop surface 50 formed on, at, about, and/or proximate to an opening 54 of the receiving aperture 27 to pin the sleeve 30 in position between the head 45 and the handle 14.

With reference to FIGS. 2-5, as the collet 28 moves in the first direction D1 (e.g., toward the handle 14 and further into the aperture 27), the flared face 46 of the sleeve 30 exerts a force (e.g., a compressive force) on the head 45 adjacent the first end 28*a* of the collet 28, which causes the portions of the collet 28 to move radially inwardly, compressing the slots 38, 42. Similarly, as the collet 28 moves in the second direction D2, the portions of the collet 28 may move radially outwardly, decompressing the head 45 and enlarging the slots 38, 42.

Each slot 38, 42 is configured to receive an offset anchor 58, tang, and/or the like of a given range of blade sizes. For example, the first slot 38 may be shaped and/or sized to receive a first blade 18*a* (e.g., a number 2 blade or "#2 blade"—FIGS. 4B and 5), and the second slot 42 may be shaped and/or sized to receive a second blade 18*b* (e.g., a number 11 blade or "#11 blade"—FIGS. 4C, 4D, and 5). Therefore, a #2 blade 18*a* can be positioned in the first slot 38, or a #11 blade 18*b* can be positioned in the second slot 42 of the collet 28 depending on the needs of the user. In some embodiments, the collet 28 may receive blades of additional or alternative sizes.

As best illustrated in FIGS. 4B-4D, and 5, the tang 58 of each blade 18*a*, 18*b* can include a tang length TL and a tang width TW. Although the tang width TW may be the same or similar as a width of a cutting part of the blade 18, the tang width TW could also be different than the width of the cutting part of the blade 18. In some embodiments, the tang length TL and tang width TW of the #11 blade 18*b* are less than that of the #2 blade 18*a*. Accordingly, the length and width of the slots 38, 42 may be sized to correspond to the length and width of the different blades. For example, the first length L1 and first width W1 of the first slot 38 are suitable to receive the tang 58 of the #2 blade 18*a*, and the second length L2 and second width W2 of the second slot 42 are suitable to receive the tang 58 of the #11 blade 18*b*. Rotation of the chuck 22 relative the handle 14 alters the width of the slots 38, 42 to thereby clamp the collet 28 down on to the tang 58 of whichever blade 18 is received in the slot 38, 42.

Figure 6:
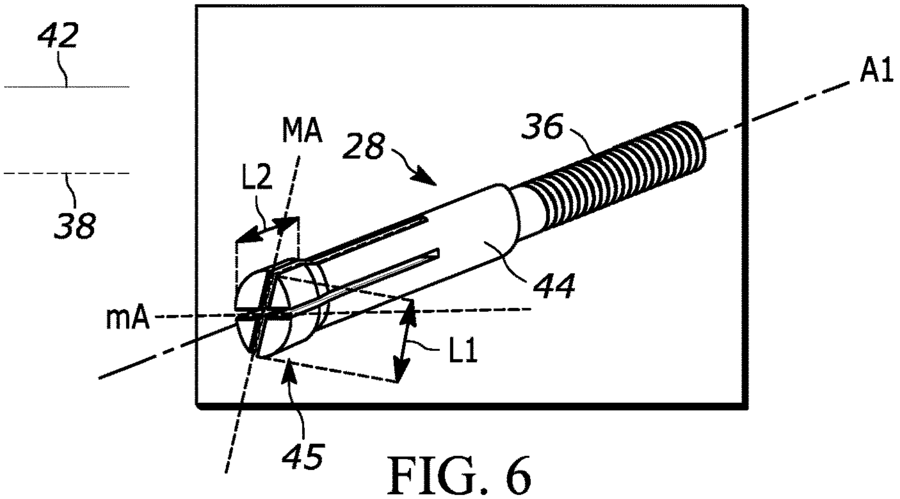
FIG. 6 is a perspective view of the collet of FIG. 2, illustrating blade receiving slots.

Referring now to FIG. 6, the first length L1 of the first slot 38 and the second length L2 of the second slot 42 extend though the axis A1, which in the illustrated embodiment represents a longitudinal axis the utility knife 10. The slots 38, 42 may optionally intersect to form a cross or "X" through a middle of the collet 28. In the illustrated embodiment, the first slot 38 extends along a major axis MA (e.g., long axis, major diameter, etc.) of an elliptical part of the collet 28 and into the stem body 44 through the head 45. Similarly, the second slot 42 extends along a minor axis mA (e.g., short axis, minor diameter, etc.) of the elliptical part of the collet 28 and into the stem body 44 through the head 45. Stated another way, the first length L1 is oriented parallel to the major axis MA, and the second length L2 is oriented parallel to the minor axis mA.

During installation of a desired blade (e.g., #2 blade 18*a,* #11 blade 18*b*, etc.), the blade 18 is positioned within the corresponding slot (e.g., first slot 38, second slot 42). The chuck 22 is rotated relative the handle 14 to cause the sleeve 30 to compress the head 45 of the collet 28 (e.g., radially inwardly) toward a blade holding or clamped position, which thereby reduces the width (e.g., first width W1, second width W2) of both slots 38, 42 and secures the blade 18 to the knife 10. Thus, the first blade 18*a*, second blade 18*b*, and other blades are selectively interchangeable and useable with the same knife 10 and collet 28. More simply, when the chuck 22 is twisted in the first rotational direction R1 relative the handle 14, the threads 36*a*, 36*b* engage to draw the collet 28 into the handle 14. As the collet 28 is drawn into the handle 14, the enlarged head 45 will be squeezed by the sleeve 30 to push the slots 38, 42 closed (e.g., toward a clamped or secured position) around the desired blade placed therebetween.

Figure 7A:
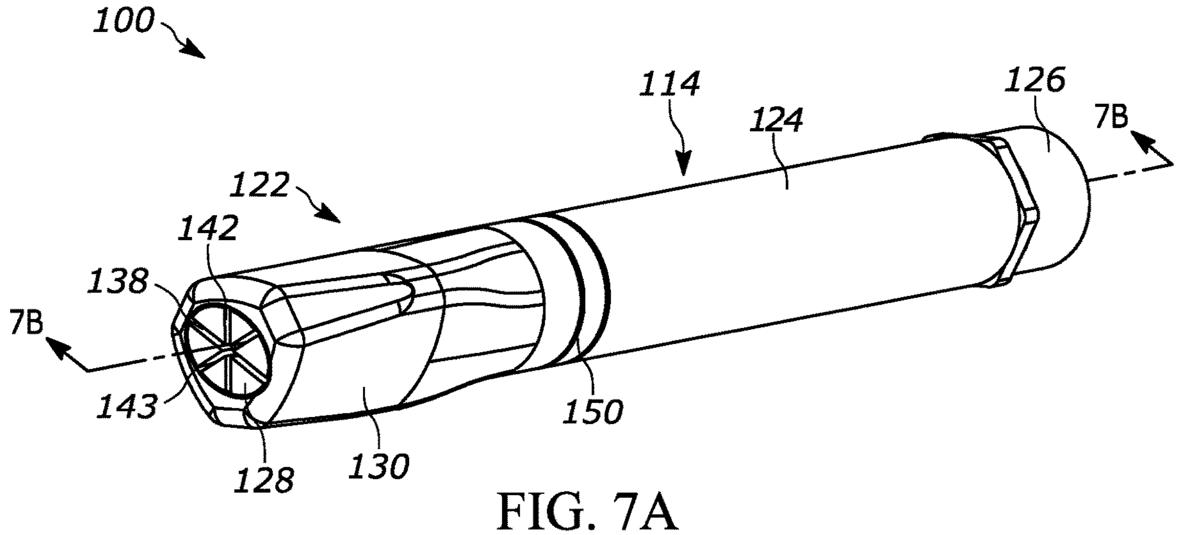
FIG. 7A is a perspective view of a utility knife according to another embodiment.
Figure 7B:
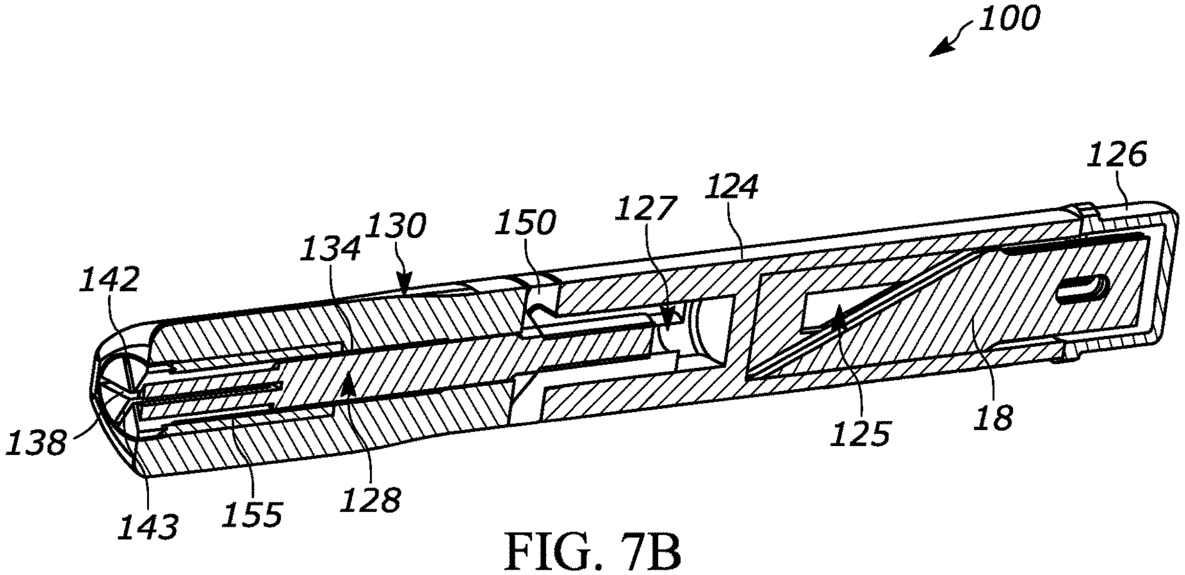
FIG. 7B is a cross-sectional view of the utility knife of FIG. 7A viewed along section 7B-7B.
Figure 7C:
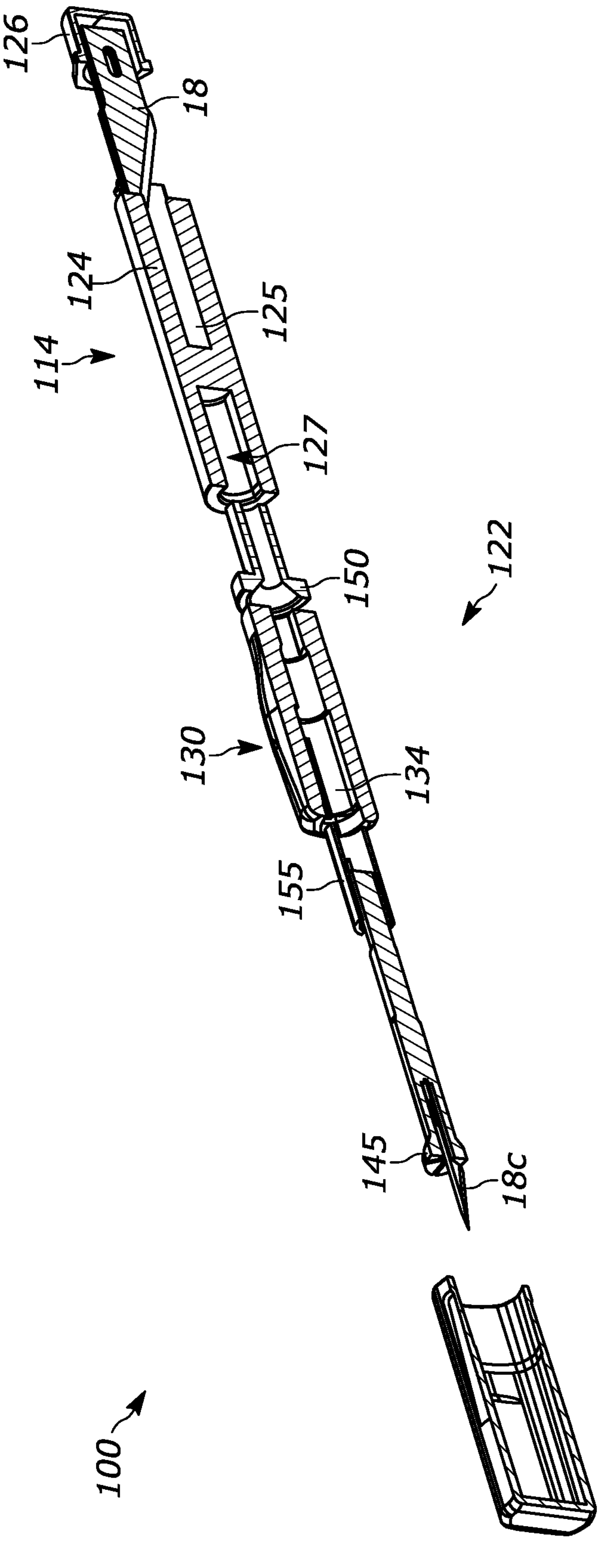
FIG. 7C is a partially exploded perspective view of FIG. 7B, additionally illustrating a cap.
Figure 8:
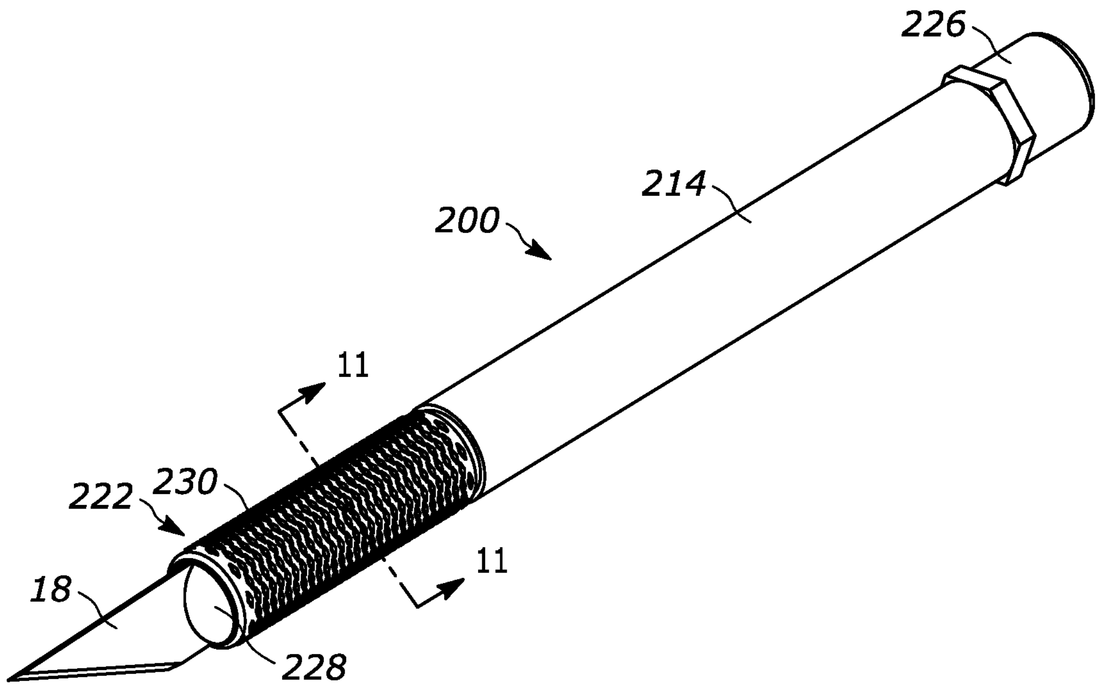
FIG. 8 is a perspective view of a utility knife according to another embodiment.
Figure 9:
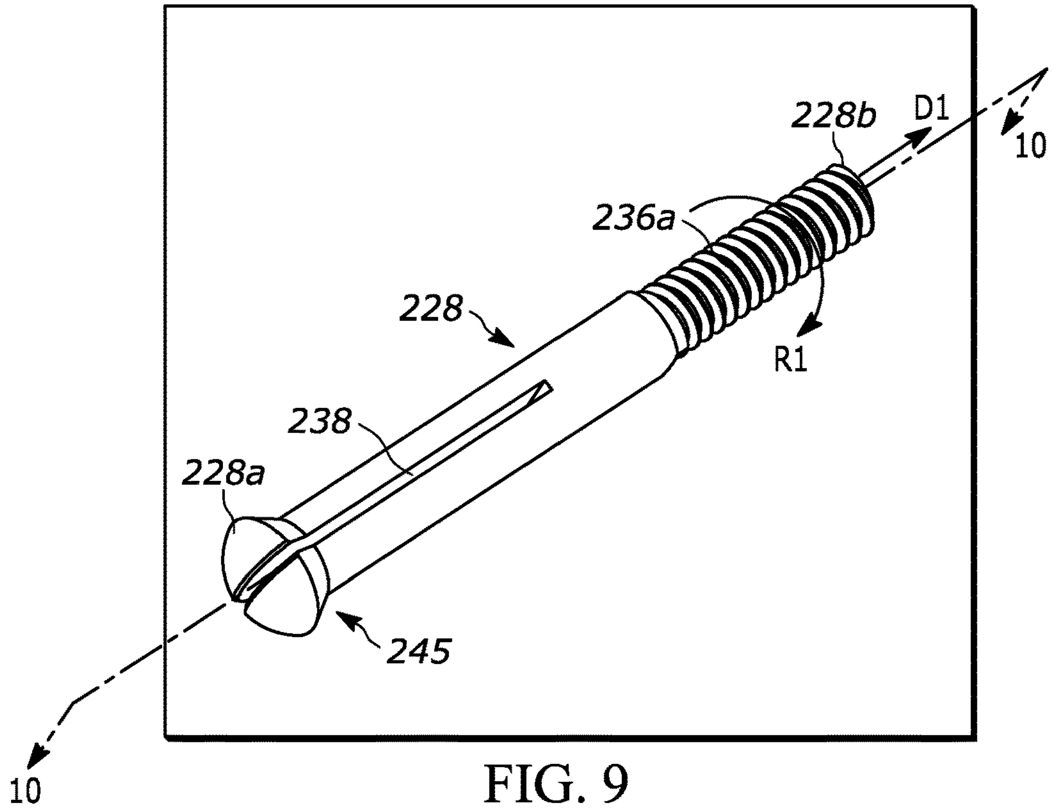
FIG. 9 is a perspective view of a collet of the utility knife of FIG. 8.

FIGS. 7A-7C illustrate a utility knife 100 according to another embodiment. The utility knife 100 of FIGS. 7A-7C is similar to the utility knife 10 described above with reference to FIGS. 1A-6, and similar features are identified with similar reference numbers, plus "100." Some similarities and differences between the knife 100 and the knife 10 are described below.

The utility knife 100 includes a handle 114 and a chuck 122 that removably accepts a variety of blades 18. As described above, portions of the chuck 122 may be caused to rotate and, thus, secure the blades 18 within the chuck 122 to perform a cutting operation. The utility knife 100 further includes a cap 126 removably coupled to a body 124 of the handle 114 to store one or more blades 18 in a storage space 125 (FIG. 7B) of the knife 100. In the illustrated embodiment of FIGS. 7A-7C, the chuck 122 includes a collet 128 and a sleeve 130 that are operable to retain the blades 18.

Some differences between the utility knife 10 and the utility knife 100 are now described with reference to FIGS. 7B and 7C.

Specifically, with reference to FIG. 7B, the sleeve 130 of the utility knife 100 may be polygonal and may include additional gripping edges or surfaces. In the illustrated embodiment, for example, the sleeve may have an overall hexagonal cross-section. In some embodiments, the sleeve 130 has more than six sides, such as eight sides, ten sides, or twelve sides. With continued reference to FIG. 7B, the collet 128 includes at least a third slot 143 in addition to a first slot 138 and a second slot 142. The third slot 143 is configured, just as the other slots 138, 142, to alternately receive a blade 18. Although three slots are shown for in the illustrated embodiment, more than three slots may be provided.

As illustrated in FIG. 7C, the third slot 143 may have a third dimension (e.g., a third length and/or a third width) that is different from the length and width of the first slot 138 and/or the second slot 142. For example, the third slot 143 may be configured to receive a blade 18 smaller than the first blade 18*a*, such as an extra fine or extra exact blade 18*c* that is smaller than the #2 blade 18*a* and #11 blade 18*b*. Stated another way, the third slot 143 allows a user to alternately secure the tang 58 of a third blade 18*c* (e.g. extra fine blade) to the knife 100. The third slot 143 may operate in the same or similar manner to the slots described above. Either utility knife 10, 100 could include a collet 28, 128 having a different number of slots.

As shown in FIGS. 7A-7C. Similar to the tapered or bulbed head 45 described above, the collet 128 includes a tapered head 145 that is partially surrounded and engaged by a bushing 155 at one end. An opposing end of the bushing 155 is supported directly in a channel 134 formed in the sleeve 130. The bushing 155 accommodates contact between the collet 128 and the sleeve 130.

Yet another difference between the utility knife 10 and the utility knife 100 is illustrated in FIGS. 7A-7C. Similar to the stop surface 50 described above, the collet 128 is threaded into a receiving aperture 127 in the handle 114 to abut the sleeve 130 against a stop bearing 150 supported on the handle 114. Just as the stop surface 50 constrains the sleeve 30 between the head 45 and the handle 14, the stop bearing 150 constrains the sleeve 130 between the bulbed head 145 and the handle 114.

FIG. 7C further illustrates a protective cap that is received on the knife 100. For clarity, each embodiment discussed herein could include the same or a similar cap.

FIGS. 8-12, illustrate a utility knife 200 according to a further embodiment. The utility knife 200 of FIGS. 8-12 is similar to the utility knife 10 described above with reference to FIGS. 1A-6, and similar features are identified with similar reference numbers, plus "200." Some similarities and differences between the knife 200 and the knife 10 are described below.

The utility knife 200 includes a handle 214 and a chuck 222 that removably accepts a variety of blades 18. As described above, portions of the chuck 222 may be caused to rotate and, thus, secure the blades 18 within the chuck 222 to perform a cutting operation. The utility knife 200 further includes a cap 226 removably coupled to the handle 214 to store one or more blades 18 in a compartment or voided region of the knife 200. In the illustrated embodiment of FIGS. 8-12, the chuck 222 includes a collet 228 and a sleeve 230 that are operable to retain the blades 18.

With reference to FIGS. 9-12, the collet 228 is positioned within a channel 234 of the sleeve 230. A first end 228*a* of the collet 228 engages and supports the blade 18, and a second end 228*b* of the collet 228 includes threads 236*a* corresponding to threads 236*b* on an inner surface of the handle 214. The first end 228*a* of the collet 228 includes a single slot 238, but could include a second slot, similar to the embodiments discussed above. When the sleeve 230 is rotated in a rotational direction R1 (e.g., twisted), the collet 228 rotates with the sleeve 230. As the sleeve 230 rotates, the threads 236*a* engage the threads 236*b* on the inner surface of the handle 214, thereby axially moving the collet 228 in a first direction D1 (e.g., toward the handle 214) to a first position. As the collet 228 moves in the first direction D1, the sleeve 230 exerts a force on the first end 228*a* of the collet 228, thereby causing the slot 238 to clamp down on the blade 18. When the slot 238 is clamped down, a width W1 of the slot 238 is decreased.

Figure 10:
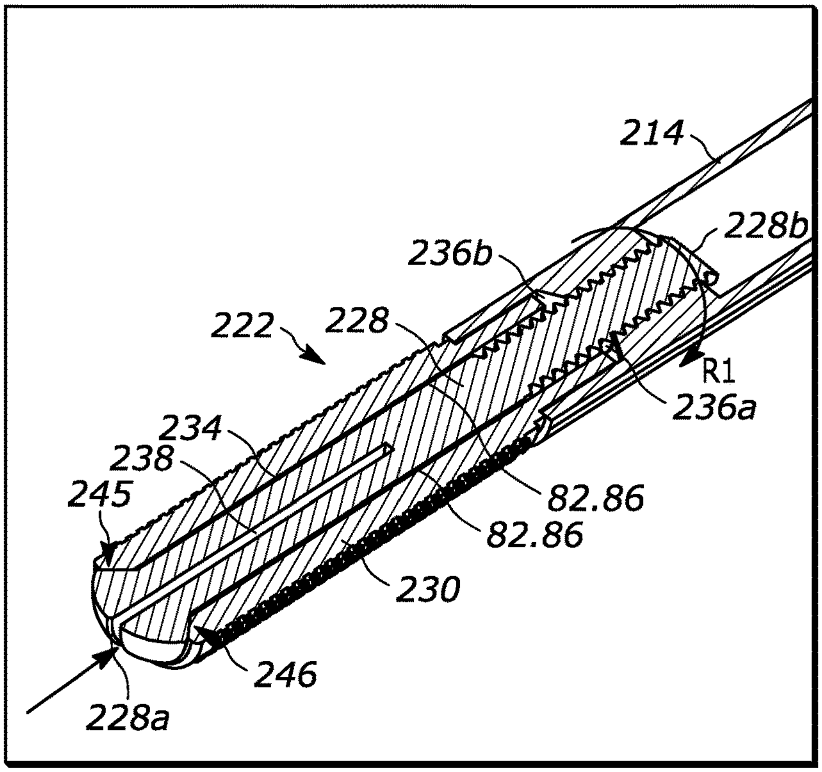
FIG. 10 is a perspective cross-sectional view of a portion of the collet of FIG. 9, viewed along section 10-10 of FIG. 9.

As best illustrated in FIG. 10, the first end 228*a* of the collet 228 includes an enlarged portion 245 that is bulbed or tapered outwardly. The enlarged portion 245 is complemented by an oppositely tapered/flared face 246 of the sleeve 230.

Some differences between the utility knife 10 and the utility knife 200 are now described with reference to FIGS. 11 and 12.

Figure 11:
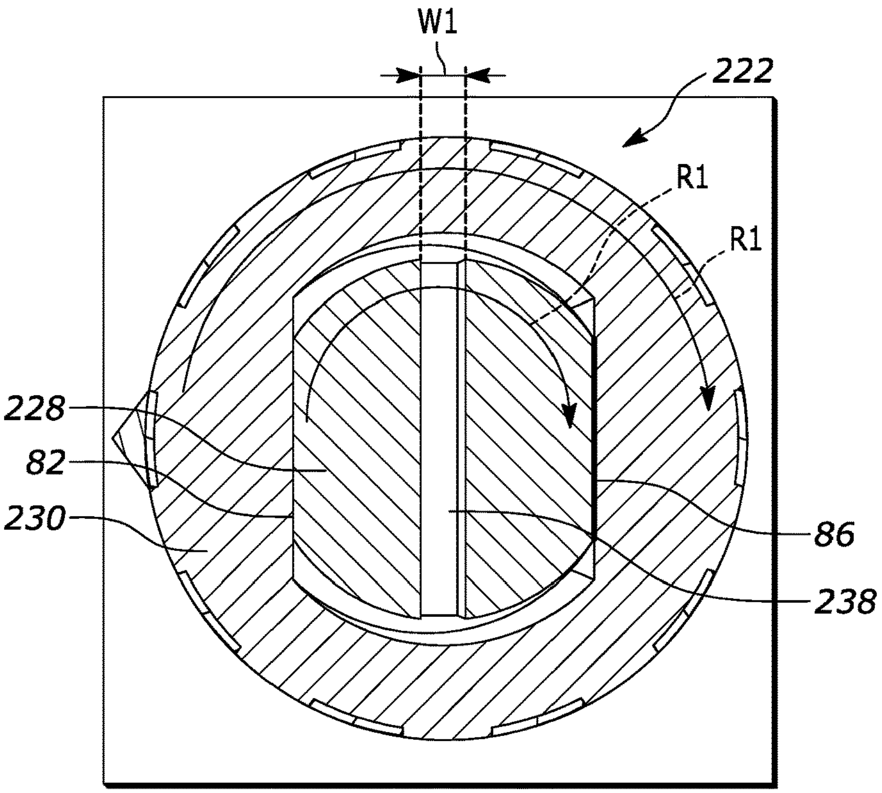
FIG. 11 is a cross-sectional view of the utility knife of FIG. 8, viewed along section 11-11.
Figure 12:
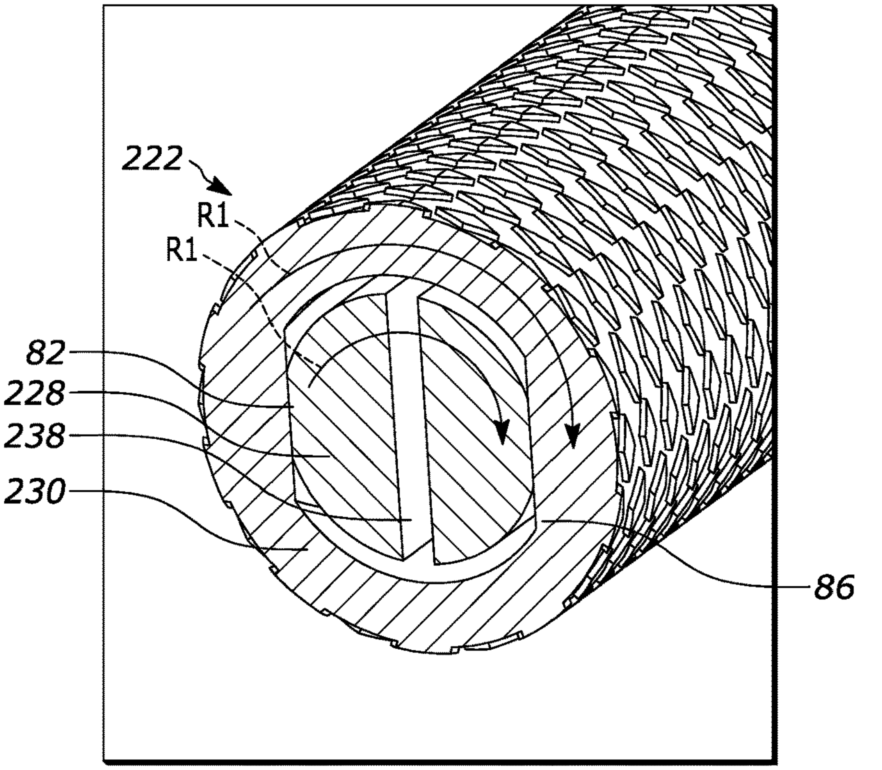
FIG. 12 is a perspective view of the cross-sectional view of FIG. 11.

With reference to FIGS. 11 and 12, the collet 228 is generally cylindrical and includes at least one non-cylindrical portion. For example, in the illustrated embodiment the collet 228 includes a pair of opposed planar (e.g., non-curved) sides 82. Similarly, the sleeve 230 is cylindrical and includes planar portions or flats 86 corresponding to the planar sides 82 on the collet 228. When the sleeve 230 is positioned on the first end 228*a* of the collet 228, the flats 86 of the sleeve 230 align with the planar sides 82 of the collet 228. As described above, because the collet 228 is positioned within sleeve 230, rotation of the sleeve 230 also causes rotation of the collet 228.

In the illustrated embodiment, the alignment of the flats 86 on the sleeve 230 with the planar sides 82 on the collet 228 causes co-rotation of the collet 228 with the sleeve 230. In the illustrated embodiment, the engagement of the planar sides 82 of the collet 228 with flats 86 of the sleeve 230 drives rotation of the collet 228 in the rotational direction R1 as the sleeve 230 is rotated in the rotational direction R1. In some embodiments, the sleeve 230 and the collet 228 may include fewer or more planar portions, or may include planar portions having alternative shapes and/or sides (e.g., polygonal planer portions).

In contrast to a conventional utility knife in which the user is often required to repeatedly tighten a sleeve to a handle and rely on friction to maintain tightness, the planar sides 82 and flats 86 of the utility knife 200 allow the collet 228 and the sleeve 230 to lock together for co-rotation without relying on friction and tolerance. The planar sides 82 and flats 86 also allow the user to rotate the collet 228 and the sleeve 230 without requiring the user to grasp a front of the chuck 222, preventing the user from unintentionally grasping the blade 18.

Figure 13:
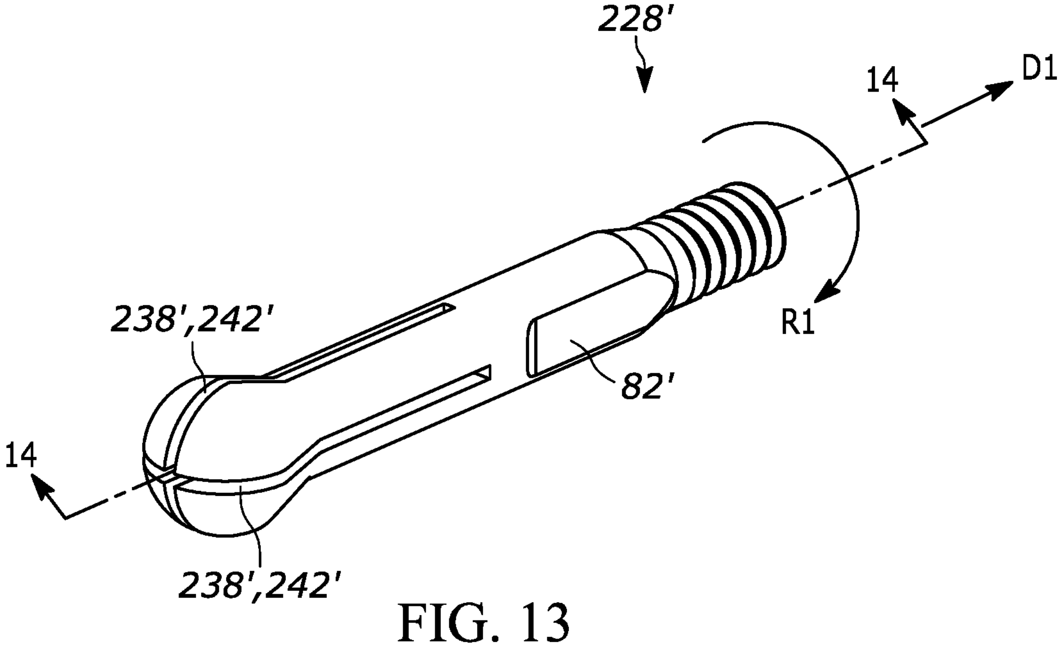
FIG. 13 is a perspective view of a collet according to another embodiment.
Figure 14:
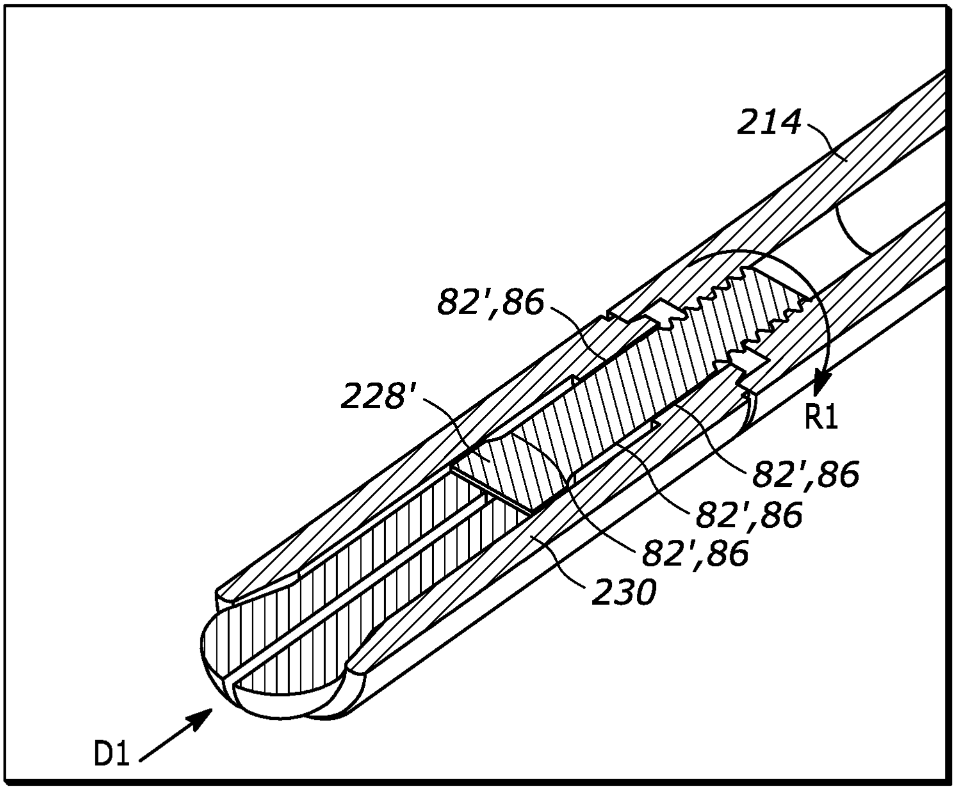
FIG. 14 is a perspective cross-sectional view of the collet of FIG. 13, viewed along section 14-14.

FIGS. 13 and 14 illustrate a collet 228' according to another embodiment. The collet 228' may be useable with any of the utility knives 10, 100, 200 described above. The illustrated collet 228' is similar to both the multi-slot collet 28, 128 of FIGS. 1-7C and the single-slot collet 228 of FIGS. 8-12 and includes similar features. More specifically, the collet 228' includes multiple slots 238', 242' configured to selectively receive differently sized blades (e.g., #11 blade, #2 blade, etc.). The collet 228' also includes planar sides 82' engageable with the flats 86 formed on the handle 214 to prevent relative rotation between the collet 228' and the handle 214.

Additionally and/or alternatively, the multiple slots 238', 242' of the collet 228' may be configured to receive either of the differently sized blades. The collet 228' may then be alternately exchangeable with another of the collet 228' depending on which blade a user would like to use. For example, each of the multiple slots 238', 242' of a single collet 228' can be similarly sized/dimensioned for one type of blade (e.g., the #11 blade), and each of the multiple slots 238', 242' of a different collet 228' can be similarly sized/dimensioned for a different type of blade (e.g., the #2 blade). In other words, multiple collets 228' may be alternately received by the handle 214 such that one collet 228' is configured to use with the #11 blade and a different collet 228' is configured for use with the #2 blade.

As described above, the sleeve 230 is rotatable relative the collet 228' in the rotational direction R1 to draw the collet 228' into the handle 214, along the first direction D1, via one or more threads (e.g., threads 236*a*, 236*b*).

It should be understood that, for some embodiments discussed herein, the provision of multiple slots in a single collet provides a larger clamping force exerted on a blade received in one of the slots compared to the clamping force exerted on a blade received in a collet having a single slot.

Although the disclosure has been described in detail with reference to certain preferred embodiments, variations and modifications exist within the scope and spirit of one or more independent aspects as described.

What is claimed is:

1. A utility knife comprising:

a handle having a body and a receiving aperture;

a collet at least partially receivable in the receiving aperture, the collet having a first end and a second end, the first end of the collet including a first slot and a second slot formed therein, the first slot having a first dimension and the second slot having a second dimension different from the first dimension, the collet configured to alternately receive one of a portion of a blade of a first type in the first slot and a portion of a blade of a second type in the second slot; and a sleeve engageable with and surrounding the collet, wherein a cross-section of a portion of the sleeve is polygonal.

2. The utility knife of claim 1, wherein the cross-section of the portion of the sleeve is hexagonal.

3. The utility knife of claim 1, wherein the body includes an internal space for storing at least one blade that is not in use, and wherein the utility knife further comprises an end cap removably coupled to the body to selectively cover the internal space.

4. The utility knife of claim 1, wherein the second end of the collet is threadably coupled to the handle, wherein the collet is moveable along an axis relative the sleeve, and wherein rotation of the sleeve threads the collet into the receiving aperture along the axis.

5. The utility knife of claim 1, wherein the collet includes a tapered head, and wherein the tapered head is partially surrounded and engaged by a bushing.

6. The utility knife of claim 5, wherein the bushing is supported within a channel in the sleeve.

7. The utility knife of claim 5, further comprising a stop bearing supported by the handle, wherein threading the collet into the receiving aperture brings the tapered head toward the handle to abut the sleeve against the stop bearing.

8. The utility knife of claim 1, wherein the first dimension and the second dimension are reduced as the collet is threaded into the receiving aperture.

9. The utility knife of claim 1, wherein the collet further includes a third slot formed therein, the third slot having a third dimension different than the first dimension and the second dimension, wherein the third slot is configured to selectively receive a portion of a blade of a third type.

10. A utility knife comprising:
- a collet extending along an axis, the collet including,
  - a body having a first width,
  - a tapered head having a second width greater than the first width,
  - a first slot extending along the axis into the head, the first slot having a first length,
  - a second slot extending along the axis into the head, the second slot intersecting the first slot and having a second length, the first slot and the second slot each configured to receive a different type of blade having tangs with different lengths, and
  - a threaded shank;
- a sleeve partially surrounding the tapered head of the collet, the sleeve defining a channel;
- a bushing disposed within the channel, wherein the tapered head is partially surrounded and engaged by the bushing; and
- a knife handle configured to receive the threaded shank.

11. The utility knife of claim 10, wherein a cross-section of a portion of the sleeve is polygonal.

12. The utility knife of claim 10, wherein the sleeve is rotatable in a first direction to drive the threaded shank toward the knife handle and thereby compress the first and second slots, and wherein the sleeve is rotatable in a second direction to drive the threaded shank away from the knife handle and thereby uncompress the first and second slots.

13. The utility knife of claim 12, wherein a first blade is secured in the first slot when the tang of the first blade is positioned in the first slot and the collet is in a blade holding position, the first tang having a first length,
- wherein a second blade is secured in the second slot when the tang of the second blade is positioned in the second slot and the collet is in the blade holding position, the second tang having a second length, and
- wherein the first blade and the second blade are interchangeable with the collet.

14. The utility knife of claim 13, wherein the first blade and the second blade can be stored in an internal storage space when not being used, and wherein the internal storage space is formed in the handle and is selectively coverable by an end cap removably coupled to the handle.

15. The utility knife of claim 10, wherein the collet includes a major diameter and a minor diameter, wherein the first length is defined along the major diameter and the second length is defined along the minor diameter, and wherein the first slot and the second slot each extend through a central point of the collet.

16. The utility knife of claim 10, wherein the collet further includes a third slot extending along the axis into the head,
- wherein the third slot intersects both the first slot and the second slot, and
- wherein the third slot has a third length the corresponds to a tang of a third blade.

17. The utility knife of claim 16, wherein the third blade is secured in the third slot when the tang of the third blade is positioned in the third slot and the collet is in the blade holding position, and wherein the first blade, the second blade, and the third blade are interchangeable with collet.

18. A utility knife configured for interchangeable use with a plurality of types of knife blades, the utility knife comprising:
- a collet including a first end and a second end;
- a first slot positioned in the first end and configured to receive a knife blade of a first type, the first slot having a first dimension;
- a second slot positioned in the first end and configured to alternately receive a knife blade of a second type, the second slot having a second dimension different from the first dimension,
- a third slot positioned in the first end and configured to alternately receive a knife blade of a third type, the third slot having a third dimension smaller than both the first dimension and the second dimension; and
- a sleeve engageable with and surrounding the collet.

19. The utility knife of claim 18, wherein a cross-section of a portion of the sleeve is polygonal.

20. The utility knife of claim 18, further comprising a handle, wherein the collet is coupled to the handle, and wherein the handle includes an internal space for storing at least one blade that is not in use.

* * * * *